(12) United States Patent
Van Halteren et al.

(10) Patent No.: US 7,961,899 B2
(45) Date of Patent: Jun. 14, 2011

(54) HEARING AID MICROPHONE MOUNTING STRUCTURE AND METHOD FOR MOUNTING

(75) Inventors: Aart Zeger Van Halteren, Hobrede (NL); Karsten Videbaek, Roskilde (DK)

(73) Assignee: Sonion Nederland B.V., Amsterdam (NL)

( * ) Notice: Subject to any disclaimer, the term of this patent is extended or adjusted under 35 U.S.C. 154(b) by 1610 days.

(21) Appl. No.: 11/202,136

(22) Filed: Aug. 11, 2005

(65) Prior Publication Data

US 2006/0034473 A1 Feb. 16, 2006

Related U.S. Application Data

(60) Provisional application No. 60/600,744, filed on Aug. 11, 2004.

(51) Int. Cl.
*H04R 25/00* (2006.01)
(52) U.S. Cl. .......................... 381/324; 381/322; 381/329
(58) Field of Classification Search .................. 381/322, 381/324, 328, 329, 330, 355, 361, 365, 366, 381/368
See application file for complete search history.

(56) References Cited

U.S. PATENT DOCUMENTS

| | | | |
|---|---|---|---|
| 5,231,659 A | 7/1993 | Abraham et al. | |
| 5,386,476 A | 1/1995 | Bisgaard et al. | |
| 5,613,011 A * | 3/1997 | Chase et al. | 381/361 |
| 6,091,831 A | 7/2000 | Cho | |
| 6,134,335 A | 10/2000 | Yang | |
| 6,430,296 B1 * | 8/2002 | Olsen | 381/322 |
| 7,151,839 B2 * | 12/2006 | Niederdrank | 381/324 |
| 2002/0076075 A1 | 6/2002 | Muller et al. | 381/326 |
| 2003/0076970 A1 | 4/2003 | van Halteren et al. | |

FOREIGN PATENT DOCUMENTS

| | | |
|---|---|---|
| DE | 2941971 A1 | 4/1981 |
| DE | 3616637 A1 | 11/1987 |
| DE | 10228828 C1 | 10/2003 |
| EP | 1215937 A2 | 6/2002 |
| WO | WO 94/13116 A1 | 6/1994 |
| WO | WO 98/47319 | 10/1998 |
| WO | WO 01/54457 | 7/2001 |
| WO | WO 2004/025990 A1 | 3/2004 |

OTHER PUBLICATIONS

European Search Report; Application No. 05017377.2: Apr. 8, 2009 (12 pages).
Chinese Office Action, Application No. 200510098110.7: Jun. 9, 2010.

\* cited by examiner

*Primary Examiner* — Huyen D Le
(74) *Attorney, Agent, or Firm* — Nixon Peabody LLC

(57) ABSTRACT

The disclosure relates generally to hearing aids, hearing aid microphones, and methods of manufacture thereof. In one aspect, a hearing aid microphone in accord with the present concepts includes a housing and at least one attachment device integrated with the housing, the attachment device itself including a male connector or a female connector.

7 Claims, 4 Drawing Sheets

HEARING AID MICROPHONE MOUNTING STRUCTURE AND METHOD FOR MOUNTING

RELATED APPLICATION

This application claims the benefit of U.S. Provisional Application No. 60/600,744, entitled "Hearing Aid Microphone Mounting Structure And Method For Mounting," filed Aug. 11, 2004.

TECHNICAL FIELD

The disclosure relates generally to hearing aids, hearing aid microphones, and methods of manufacture thereof.

BACKGROUND

Hearing aid microphones are electroacoustic transducers which convert acoustical energy (e.g., sound waves) into an audio signal. This signal is then processed (e.g., amplified) and sent to a receiver, which converts the processed signal into acoustical sound waves that are output toward the eardrum.

Design considerations for hearing aid microphones include, but are not limited to, size, bandwidth, and ease of repair. Minimization of the hearing aid size is an ever present aesthetic concern. Decreases in the microphone size or the microphone mounting structure enables a corresponding decrease in the size of the hearing aid. For this reason, many conventional hearing aids employ an adhesive connection (e.g., glue) to secure the microphone relative to the faceplate. However, the harsh environment faced by hearing aid microphones often necessitates repair or replacement of the microphone. Despite the size-minimization benefit provided by directly gluing the microphone to the faceplate, such hearing aid microphones are difficult, if not impossible, to repair or replace without breaking either or both of the microphone or faceplate.

Bandwidth is another design consideration. Bandwidths, previously limited to about 6-8 kHz by clock frequencies below about 16 kHz, are now required to extend up to about 10 kHz, with particular emphasis on the higher frequencies.

WO 01/54457 discloses one conventional "in the ear" (ITE) hearing aid for at least partial insertion into the ear canal comprising a housing, a faceplate 1, a battery drawer compartment 6, and a microphone 8, 9 mounted at least partially in the faceplate. As shown in FIG. 4, microphone 8, 9 is held in place by locking arms, which are not numbered. A sealing element 10 is provided to form a seal between the faceplate 1 and the microphone 8,9, and possesses openings in line with corresponding openings in the faceplate and the microphone. As microphone 8, 9 is held in place by the locking arms, sealing element 10 appears likely to be at least substantially non-adhesive, which would facilitate repair and/or replacement of the microphone.

However, the structure of the locking arms in the hearing aid of WO 01/54457 disadvantageously demands significant space both adjacent and behind the microphone 8, 9. As an initial matter, the length of the microphone is an important parameter. As shown, the locking arms limit the length of the microphone 8, 9 by an amount corresponding to the height of the inwardly projecting members of locking arms. More significantly, electrical contacts for hearing aid microphones are typically provided on the backside of the microphone, such as by a printed circuit board that is glued to the microphone housing. Any variations in the distribution of the glue can lead to overall microphone length variations which, when coupled with an attachment device that grips the rear surface of the microphone, as shown in WO 01/54457, results in uneven pressure on the sealing element 10.

Despite the improvements realized by WO 01/54457, room for further improvements to hearing aid microphones and for hearing aids incorporating such microphones to facilitate repair and/or replacement of the microphone, minimize the size of the hearing aid, and/or provide enhanced bandwidth is desired.

SUMMARY

In accord with the present disclosure, there is provided a hearing aid microphone comprises a housing and at least one attachment device integrated with the housing, the attachment device comprising a male connector.

Also in accord with the present disclosure is provided a microphone of a hearing aid, comprising a housing and at least one attachment device integrated with the housing, the attachment device comprising a female connector.

In another aspect, a hearing aid is provided which includes a microphone, the microphone includung a housing and an attachment device integrated with the housing. The hearing aid base structure includes another attachment device. The attachment devices are configured to matingly and releasably connect the microphone to the hearing aid base structure.

In still another aspect, a hearing aid comprises a microphone including a housing and an attachment device integrated with the housing, and a hearing aid base structure, which includes a microphone receiving cavity. The microphone receiving cavity includes another attachment device. An acoustic seal is disposed between the microphone and the hearing aid base structure. The attachment devices are configured to matingly and releasably connect the microphone to the hearing aid base structure.

In yet another aspect, a hearing aid system comprises a microphone including a housing and an attachment device integrated with the housing and a hearing aid base structure including another attachment device and including a tool insertion opening leading from a front surface of said hearing aid to said attachment device. The attachment devices are configured to matingly and releasably connect the microphone to the hearing aid base structure. The hearing aid system also includes a tool for insertion into said tool insertion opening to release said microphone from said hearing aid base structure.

In another aspect, there is provided a method for releasably mounting a microphone in a hearing aid, comprising the steps of providing a microphone including a housing and an attachment device integrated with the housing, providing a hearing aid base structure including a microphone receiving cavity bearing another attachment device, inserting the microphone into the hearing aid base structure microphone receiving cavity, and releasably engaging the attachment devices.

In yet another aspect, a method for releasably mounting a microphone in a hearing aid, comprises the steps of providing a microphone comprising a housing and an attachment device including a resilient male connector integrated with the housing and providing a hearing aid base structure comprising a microphone receiving cavity bearing another attachment device. The method also includes inserting the microphone into the hearing aid base structure microphone receiving cavity in part by biasing a movable portion of the resilient male connector from a first position to a second compressed position to permit insertion of the microphone into the hearing aid base structure. The method also includes releasably engaging said attachment device integrated with said another attachment device associated with said microphone housing receiving cavity.

In still another aspect, a method for disengaging a microphone from a microphone receiving cavity in a hearing aid, comprises the steps of inserting a tool component into a tool insertion opening provided on a front side of said hearing aid and using said tool component to bias a movable portion of a resilient male connector integrated with said microphone from an initial position to a second compressed position to permit disengagement of the resilient male connector from a corresponding recess in the hearing aid base structure.

Another aspect includes a method for removing a microphone from a microphone receiving cavity in a hearing aid, comprising the steps of inserting a tool component into a tool insertion opening provided on a front side of said hearing aid, using said tool component to disengage a male connector integrated with said microphone from a mating female connector integrated with the microphone receiving cavity in the hearing aid base structure, and removing said microphone from said hearing aid microphone receiving cavity.

Additional aspects of the present disclosure will become readily apparent to those skilled in the art from the following detailed description, wherein various general aspects of the concepts presented herein are described by way of illustrative examples.

BRIEF DESCRIPTION OF THE DRAWINGS

Reference is made to the attached drawings, wherein elements having the same reference numeral designations represent like elements throughout, and wherein.

DETAILED DESCRIPTION

Figure 1A:
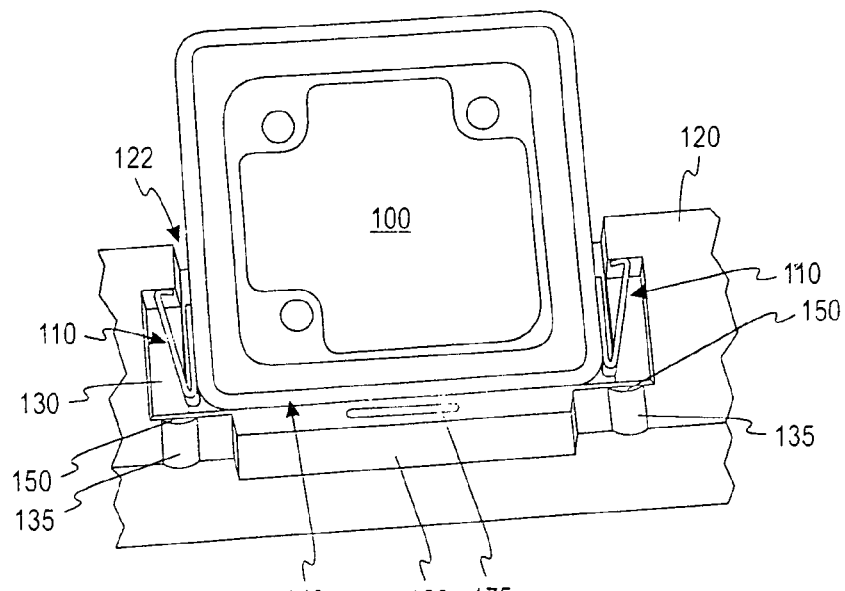
FIG. 1(a) is a cross-sectional view of a first embodiment of a hearing aid microphone bearing attachment devices in accord with the present concepts.
Figure 1B:
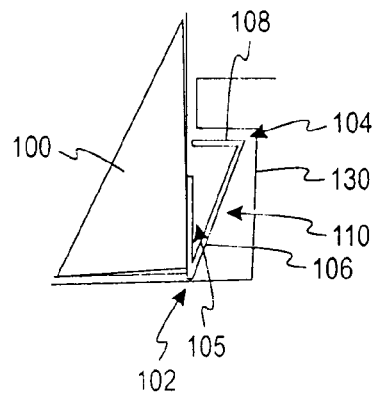
FIG. 1(b) is a side-view of a first example of an attachment device in accord with the present concepts.
Figure 1C:
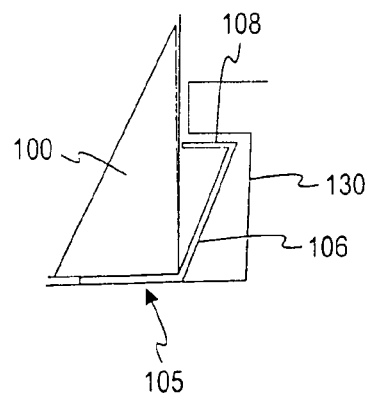
FIG. 1(c) is a side-view of a second example of an attachment device in accord with the present concepts.
Figure 1D:
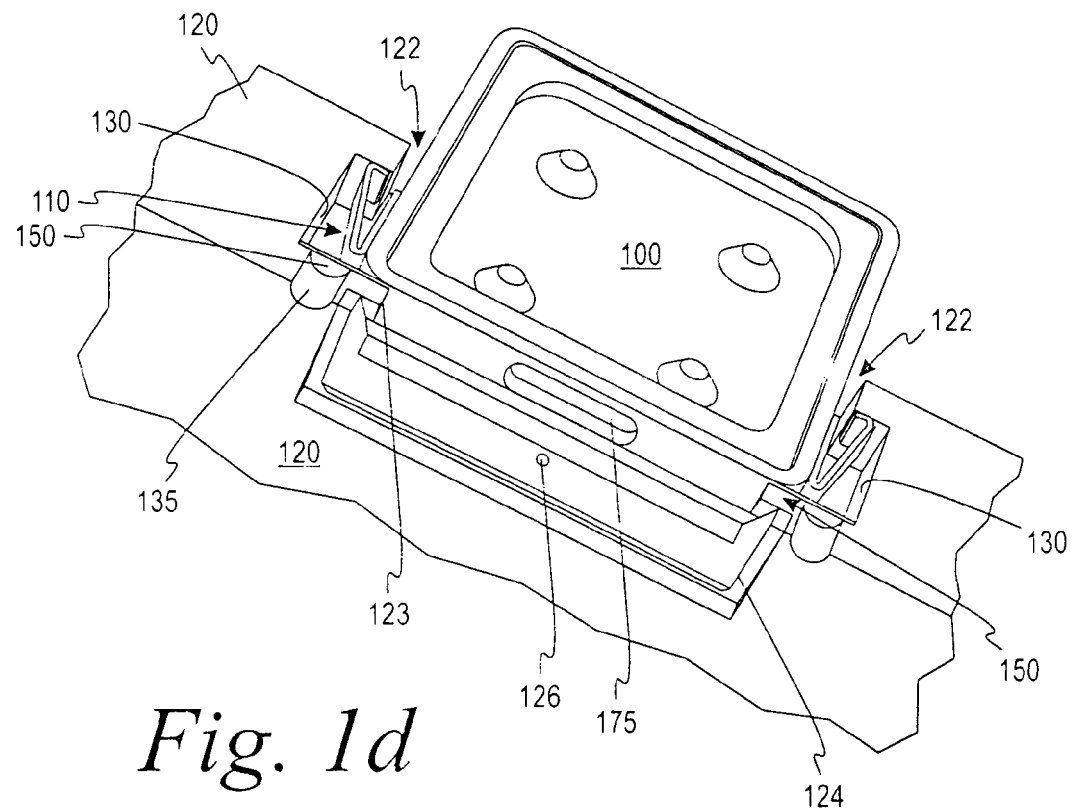
FIG. 1(d) is a cross-sectional view of the first embodiment of a hearing aid microphone bearing a wind screen.

FIGS. 1(a)-1(d) illustrate examples of a microphone 100 in accordance with the present concepts. The microphone 100 has a square or rectangular housing, shown in cross-section in FIG. 1(a) and has a plurality of attachment devices 110 (hereinafter "resilient protrusions 110") distributed about an exterior surface thereof. The resilient protrusions 110 contemplated for use in combination with the microphone 100 are not limited to such embodiment and may take the form of other conventional releasable male connectors including, but not limited to, any form of male connectors (e.g., rigid protrusions), snap-lock connectors, pins, and/or turn-to-lock connectors. Mating connectors (e.g., recesses 130) are provided in the hearing aid, of which of portion of a hearing aid base structure 120 is depicted in FIG. 1(a) and FIG. 1(d), to permit the resilient protrusions 110 to be reliably and releasably secured to the hearing aid.

The resilient protrusions 110 comprise, in the example of FIGS. 1(a)-1(e), a proximal or hinged leading end 102, a distal or cantilevered trailing end 104, a base portion 105, a movable portion 106, and an optional inwardly projecting edge 108. The inwardly projecting edge 108 may be oriented so as to be substantially perpendicular to the housing of the microphone 100 or may alternatively be canted toward front or rear portions of the microphone and serves, in part, to limit the inward movement of the movable portion 106 toward the microphone. In other words, the minimum height of the upper movable portion 106 from the exterior surface of the microphone 100, termed the stack height herein, may be arbitrarily limited by the edge 108 to a predetermined height greater than the combined thickness of the base portion 105 and movable portion 106.

As shown in FIG. 1(a), the resilient protrusions 10 are adapted to fit within corresponding recesses 130 formed in a hearing aid base structure 120 such as, but not limited to, the faceplate. The hearing aid base structure 120 comprises a rear opening 122 providing access to a microphone receiving cavity into which the microphone 100 bearing the attachment devices (e.g., resilient protrusions 110) may be inserted and removed. The microphone receiving cavity is generally defined as the space between the rear opening 122 and the front opening 123 of the hearing aid base structure 120, to which the recesses 130 are added. For the microphone 100 depicted in FIGS. 1(a), 1(d), and 1(e), the rear opening 122 has a width equal to or larger than the combined widths of the microphone and the stack heights of the opposing resilient protrusions 110 (i.e., the sum of the microphone width and the minimum height of each of the movable portions 106 relative to the exterior surface of the microphone housing).

The resilient protrusions 110 are adapted to move between at least a first position, corresponding to an extended or equilibrium state wherein the resilient protrusion is biased outwardly from the microphone 100 by a predetermined amount, and a second position wherein the movable portion 106 of the resilient protrusion 110 is inwardly compressed toward the microphone. The second position represents a minimum level of compression of the movable portion 106 to permit insertion of the microphone 100 into the corresponding rear opening 122 in the hearing aid base structure 120. In one aspect, the spring force is advantageously between about 50-200 grams, although lower and higher spring forces certainly lend themselves to and are included within the present concepts.

The resilient protrusions 110 and the recesses 130 are disposed at a depth of the hearing aid base structure 120 wherein a positive locking therebetween occurs when the front face 140 of the microphone 100 is contacting or is proximal to a front opening 123 of the hearing aid base structure 120. In one aspect, the width of the front face 140 of the microphone 100 is greater than the corresponding width of the front opening 123. In another aspect, the width of the front face 140 of the microphone 100 is less than or equal to the corresponding width of the front opening 123 and the microphone is retained in place by the resilient protrusions 110. This latter configuration permits removal of the microphone 100 through the front of the hearing aid. In one aspect thereof, the resilient protrusions 110 could advantageously be rotated 180° from that of the illustrated example of FIGS. 1(a)-1(e) so that the resilient protrusions leading edge 102 and trailing edge 104 are reversed. In another aspect thereof, the resilient protrusions 110 could be replaced by rigid attachment devices (e.g., a rigid metal or plastic protrusion) adapted to fit with a turn-to-lock recess (e.g., an L, T, or substantially L-shaped or T-shaped groove in which the microphone rigid attachment devices may be inserted into the hearing aid base structure 120 along one leg of the "L", followed by a locking rotation into the other leg of the "L") formed within the hearing aid base structure. Such exemplary configurations advantageously permit the microphone 110 to be removed from the front of the hearing aid without having to "crack" the hearing aid open, as is conventionally done to remove a microphone for repair or replacement. In accord with such configurations, the wiring connecting the microphone to other electrical components (e.g., battery, signal processor, etc.) may advantageously be lengthened to simplify and/or permit removal (e.g., desoldering) of the old microphone and attachment (e.g., soldering) of a new microphone without cracking open the hearing aid or disturbing the wiring connections.

To improve the appearance of the hearing aid base structure 120 having such a prominent front opening 123, a wind screen 124 may be provided adjacent the front opening, as shown in FIG. 1(d). The wind screen 124 typically, but is not necessarily, of the same material and of the same color as that of the hearing aid base structure 120 (e.g., hearing aid face plate). The wind screen 124 is typically an open mesh structure. The wind screen 124 provides an opening allowing sound to travel to the microphone 100 and is optionally provided with a hole 126 to the microphone back volume to facilitate pressure equalization. Although a pressure equalization hole can be formed by piercing the microphone membrane (e.g., a 1-3 mil hole), the same acoustic resistance in the back volume may be provided by connecting the back volume of the microphone to the outside environment via a small hole (e.g., hole 126) and associated passage or channel (not shown). To avoid blockage, a conventional wax protection device may be incorporated and pressure equalization provided therefor.

A seal 150 (e.g., an acoustic seal) is disposed between the front face 140 of the microphone and the front opening 123. The seal is preferably pre-assembled or attached to at least a portion of the front face 140 of the microphone 100 and/or adjacent sides or faces of the microphone prior to insertion of the microphone 140 into the hearing aid base structure 120. Alternatively, the seal may be provided within the hearing aid base structure 120. The seal 150 may optionally be configured to occlude or partially occlude the tool insertion openings 135. In some applications, such as lower gain hearing aids, it may be desirable to leave the tool insertion openings 135 open, since the openings will provide an acoustical low pass filter effect.

The seal 150 is preferably flexible or resilient, but substantially non-adhesive, and may comprise materials including, but not limited to, C-flex, silicone, or polyether urethane. The seal 150 is preferably between about 1-8 mils thick and may be applied by any conventional processes such as, but not limited to, a stereolithography (SLA) process. In one aspect, the material used for the seal 150 may be or may comprise a tacky wax or any conventional tacky or mild adhesive (e.g., a doubled-sided adhesive tape), so long as the microphone may be readily disengaged from the hearing aid base structure 120 without damage to either the microphone 100 or hearing aid base structure. The seal 150 is an acoustic seal comprising at least one of the above-noted materials, or similar material(s), that is pressed between the front face 140 of the microphone 100 and the portion of the hearing aid base structure 120 defining the front opening 123 (e.g., the faceplate) and is kept under pressure by the locking mechanism comprising the resilient protrusions 110 and the recesses 130.

A plastic film or like protective barrier (not shown) may optionally be provided about at least a portion of the front face 140 of the microphone 100 and/or adjacent sides or faces of the microphone to provide enhanced protection against leakage or foreign matter contamination. The front opening 123 may also alternatively be sealed using a wax protection film (e.g., a C barrier) that allows the passage of acoustic signals.

In one aspect, resilient protrusions 110 comprise a metal or alloy, such as a spring steel or a 314 or 316 stainless steel. The attachment devices 110 which may be formed as a single sheet or single piece or a plurality of pieces or sheets. The attachment devices 110 may also comprise, in other exemplary aspects, a resin or plastic material. In the aspect illustrated, the attachment devices 110 (resilient protrusions 110) may comprise any resilient material able to elastically deform along one direction (e.g., rotation of the movable portion 106 about the hinged leading end 102) while providing a significant resistance to deformation along another direction (e.g., a direction which would correspond to the removal of the microphone 100 from the hearing aid base structure 120). Alternatively, for the illustrated example, the resilient protrusions 110 may comprise essentially non-resilient materials (e.g., members 105, 106) connected by a spring hinge which permits relative angular movement therebetween and which resists forces applied in a direction corresponding to the removal of the microphone 100. In various aspects, the angle formed by the members 105, 106 could be an acute angle (e.g., between about 5°-30°) or could be an obtuse angle.

In the example of FIGS. 1(a)-1(e), the resilient protrusions are formed from sheet steel having a width of about 0.8 mils and a thickness of about 0.05 mils. The hinged leading end 102 is formed with a radius of 0.01 mils, the base portion 105 has a length of about 0.8 mils, and the movable portion 106 has a length of about 0.9 mils. The inwardly projecting edge 108 forms an angle of about 100° relative to base portion 105 and is itself about 0.098 mils in length. In an equilibrium or externally unstressed state, the distal end of the movable portion 106 is spaced apart from the base portion 105 by about 0.25 mils. These dimensions merely reflect one example of an attachment device 110 in accord with the present concepts and are not intended to limit the concepts presented herein in any way.

The resilient protrusions 110 may be formed at or attached to any location along the length or depth of the microphone 100 and need not be aligned along such length or depth, nor do the resilient protrusions need to be evenly spaced about the circumference thereof. In one aspect, the resilient protrusions 110 comprise a metal and are welded to the microphone 100 housing. The connection between the resilient protrusions and the microphone 100 housing may alternatively employ adhesive bonding or mechanical connectors (e.g., screws). In the aspect depicted in FIGS. 1(a) and 1(e), the resilient protrusions 110 may be advantageously disposed on the smaller sides of the microphone to facilitate placement of the microphone as close to the battery compartment as possible. One or more resilient protrusions 110 may be provided. In one example of a single resilient protrusion 110 configuration, a single resilient protrusion may be configured to at least substantially circumscribe the microphone 100 in a skirt-like form. In another alternative embodiment, discussed below in relation to FIG. 3, a single resilient protrusion 110 may be used in combination with another type of attachment device.

To insert the microphone 100 into a corresponding hearing aid base structure, the movable portions 106 of the resilient protrusion 110 are compressed inwardly from the first position to the second position to permit insertion of the microphone through the rear opening 122. During insertion of the microphone into the hearing aid base structure 120 through the rear opening 122, compression of the resilient protrusions 110 is maintained by internal surfaces of the hearing aid base structure cavity 125, or other appurtenant surfaces. When the resilient protrusions 110 are disposed adjacent the corresponding recesses 130, the spring force of the resilient protrusions biases the movable portion 106 outwardly into the recess. The movable portion 106 and/or the recess may be configured such that a small clearance remains between the movable portion and the sidewalls of the recess 130 when the movable portion assumes an extended or equilibrium second position. Alternatively, the movable portion 106 and/or recess 130 may be optionally configured such that the movable portion and the sidewalls of the recess remain in contact with one another to provide a frictional resistance therebetween to impede relative movement.

Figure 1E:
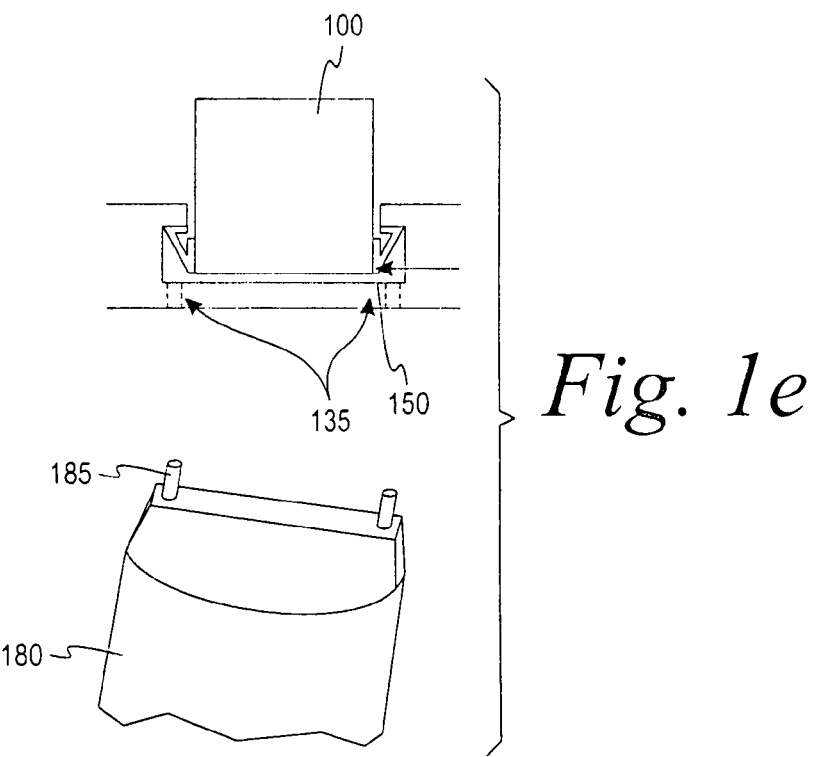
FIG. 1(e) is a side view of the first embodiment of a hearing aid microphone in accord with the present concepts and a microphone removal tool in accord with the present concepts.

At least one tool insertion opening 135 is defined at the front of the hearing aid base portion 120 in a location or locations permitting a tool component (e.g., a rigid pin) inserted therein to contact each movable member 106. FIG. 1(e) are views of an installed hearing aid microphone 100 and a microphone removal tool 180 in accord with the present concepts. The microphone removal tool 180 comprises two cylindrical components (hereinafter "tool component 185"). The tool insertion openings 135 and the associated tool component 185 may be circular in cross-section or may assume any other cross-sectional shape. Additionally, the tool insertion openings 135 need not be aligned parallel to a longitudinal or depthwise axis of the microphone housing or recess, as shown in FIG. 1(a), and may be configured at an angle thereto. The length of each tool component 185 must be sufficient to permit engagement of the tool component with an associated movable member 106 of the resilient protrusion 110 and movement of such movable member to a degree permitting disengagement of the movable member from the corresponding recess 130.

The concept of the microphone removal tool 180 and tool insertion openings 135 are broadly applicable to attachment devices, male or female, forming connections to a corresponding attachment device, male or female, within a hearing aid base structure 120, wherein either of the microphone attachment device or the hearing aid base structure attachment device is engaged by the tool component 185 and biased by external manipulation of the microphone removal tool and/or tool component to permit disengagement or detachment of the mating attachment devices.

To disengage the microphone 100 from the hearing aid base portion 120, a force is applied (e.g., by a person or machine) against the movable member 106 using a tool comprising tool a tool component or components adapted for insertion into the tool insertion opening 135. Application of such force biases the movable member 106 from the first state (e.g., equilibrium state or slightly stressed state) to the second state (e.g., a slightly compressed state, a moderately compressed state, or a fully compressed state). The microphone 100 may then be disengaged from the hearing aid base portion 120 while the movable member or members 106 are compressed.

For low gain hearing aids, the tool insertion openings 135 may be left open, as they provide a pronounced acoustical low pass filter effect. The tool insertion openings 135 may also be optionally sealed with a conventional grease, non-adhesive paste, or removable or perforable film to prevent ingress of foreign materials into the openings. In still another aspect, a non-adhesive paste or grease could optionally be disposed between the microphone and hearing air base structure 120 (e.g., the faceplate) and/or in the recesses 130.

Figure 2:
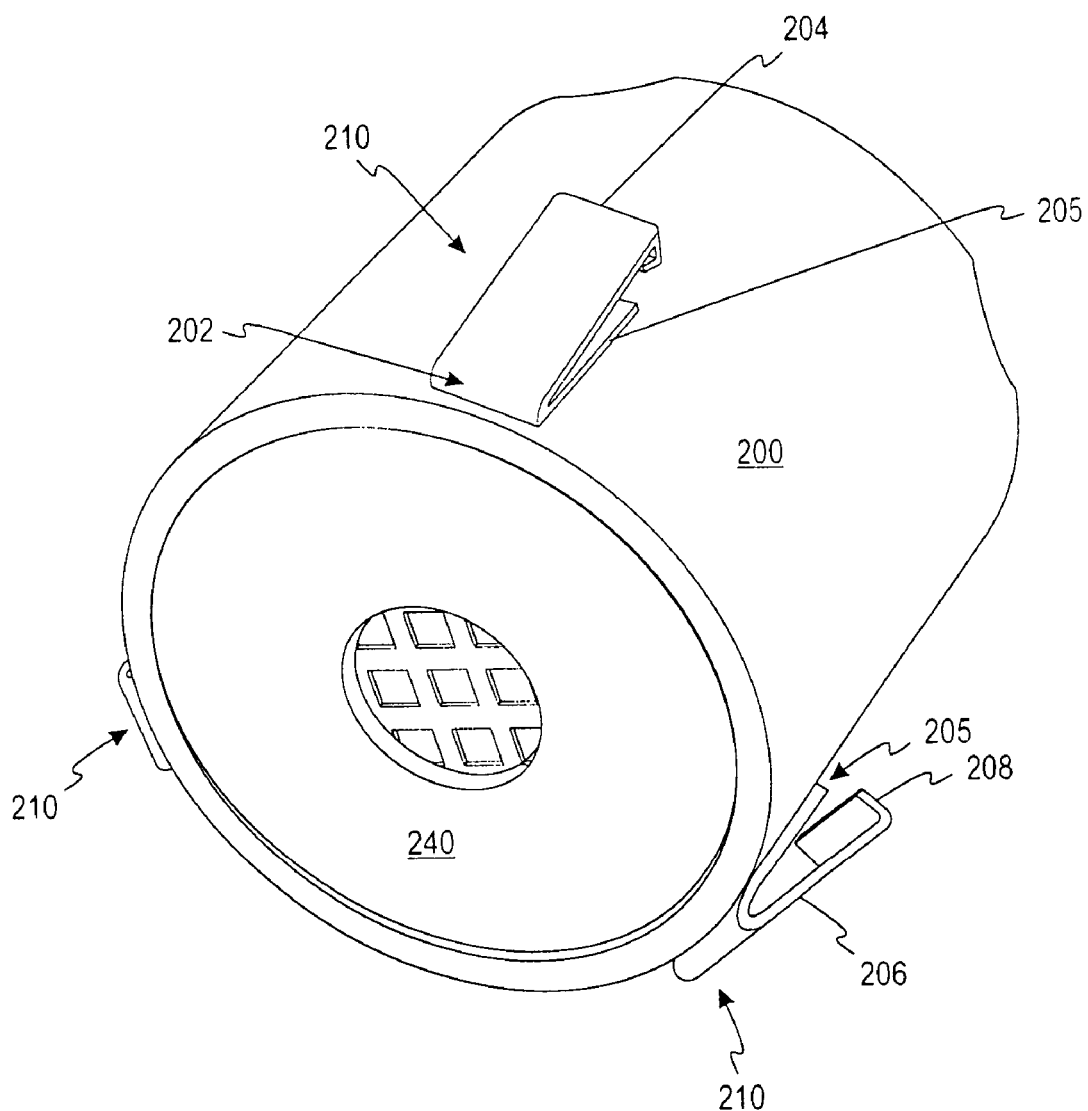
FIG. 2 is an isometric view of a second embodiment of a hearing aid microphone bearing attachment devices in accord with the present concepts.

In FIG. 2, a microphone 200 having a cylindrical housing, such as the Sonion 8000 series, is provided. Cylindrical microphones provide a flat frequency response and are well suited for directional matching applications. The shape of the microphone 200 is not limited to the illustrated examples and may include, for example, a housing having a regular polygonal or geometric shape, a curvilinear shape, or even an irregular shape. FIG. 2 has a plurality of attachment devices 210 (hereinafter "resilient protrusions 210") distributed about an exterior surface thereof. In the illustrated example, three resilient protrusions 210 are distributed substantially equally (e.g., about 120°) about the circumference of the microphone 210. A greater or lesser number of resilient protrusions 210 may be provided with a substantially equal distribution (e.g., 2 resilient protrusions spaced at 180° or 4 resilient protrusions spaced at 90°). Alternatively, the spacing of the resilient protrusions 210 may be irregular. As with the previous aspects illustrated in FIGS. 1(a)-1(e), the resilient protrusions 210 contemplated for use in combination with the microphone 200 are not limited to such embodiment and may take the form of other conventional releasable male connectors including, but not limited to, any form of male connectors (e.g., rigid protrusions), snap-lock connectors, pins, and/or turn-to-lock connectors.

The resilient protrusions 210 comprise a proximal or hinged leading end 202, a distal or cantilevered trailing end 204, a base portion 205, a movable portion 206, and an optional inwardly projecting edge 208, the details of which may be determined by reference to the associated components in FIGS. 1(a)-1(e) having like descriptors and like reference numerals. As with the previously described microphone 100 and hearing aid base structure 120, mating connectors (not shown) are provided in a corresponding hearing aid base structure to permit the resilient protrusions 210 to be reliably and releasably secured to a hearing aid, but a detailed description thereof is omitted for brevity.

Figure 3:
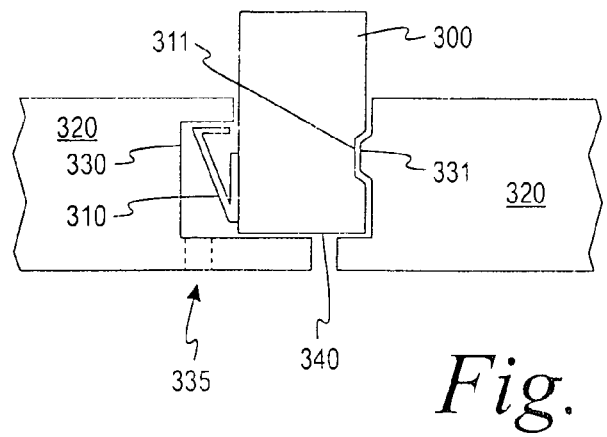
FIG. 3 is a side view of a third embodiment of a hearing aid microphone bearing attachment devices in accord with the present concepts.

FIG. 3 shows yet another aspect of the present concepts wherein a cylindrical microphone 300 includes a first attachment device 310 (hereinafter "resilient protrusion 310") and a second attachment device 311 (hereinafter "groove 311"). Insertion of the microphone 300 into the hearing aid base structure 320 may be accomplished by first compressing resilient protrusion 310 from the first position to the second position to permit insertion of the microphone through the rear opening 322. Microphone 300 is then inserted in an orientation where the movable portion 306 is rotationally displaced from the corresponding recess 330. To engage the resilient protrusion 310 and groove 311 and lock the microphone 300 to the hearing aid base structure 120, the microphone must be rotated in a direction that moves the movable portion 306 of resilient protrusion 310 toward the corresponding recess 330. At the same time, the groove 311 is likewise rotated toward a corresponding projecting member or embossment 331. Upon further rotation, the movable portion 306 of the resilient protrusion 310 expands into recess 330 and the groove 311 engages and is retained by projecting member 331.

To disengage the microphone 300 from the hearing aid base portion 320, a force is applied against the movable member 306 using a tool bearing a component adapted for insertion into tool insertion opening 335. Application of such force biases the movable member 306 from an open position to a partially or fully closed position. The microphone 300 may then be rotated to disengage groove 311 from projecting member 331 and to thereby enable removal of the microphone. It is not necessary for the resilient protrusion 310 to actually be rotated to a point where the movable member 306 rotationally disengages from the recess 330. Instead, following disengagement of the groove 311 from projecting member 331, the microphone may optionally be pulled out of the hearing aid base portion 320 while the tool component is used to maintain a biasing force on the movable member 306.

Figure 4A:
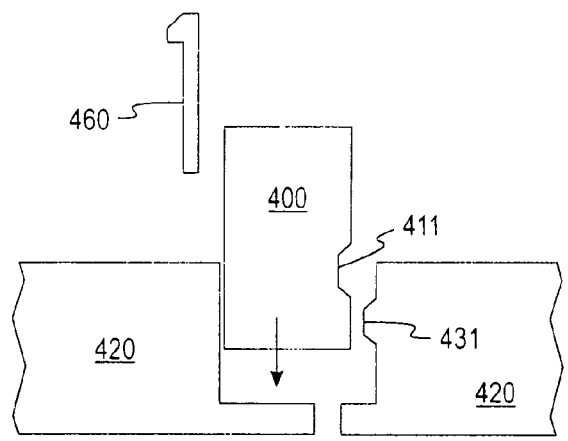
FIG. 4(a) is a side view of a fourth embodiment of a hearing aid microphone bearing attachment devices in accord with the present concepts.
Figure 4B:
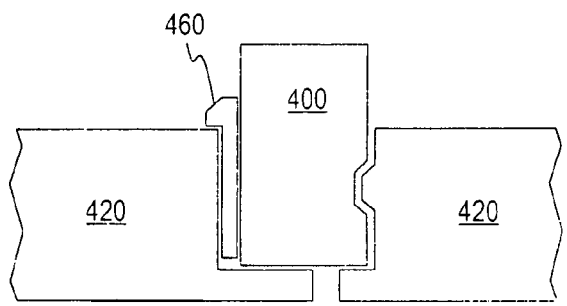
FIG. 4(b) is another side view of a fourth embodiment of a hearing aid microphone bearing attachment devices in accord with the present concepts.

FIGS. 4(*a*)-(*b*) shows a variant of the configuration shown in FIG. 3. In the variant of FIGS. 4(*a*)-(*b*), a microphone receiving cavity in the hearing aid base structure 420 is provided with a projecting member 431 and the microphone 400 is provided with a groove 411. In lieu of a resilient protrusion, a locking pin or plate 460 is used. To insert the microphone 400 into the hearing aid base structure 420 through the rear opening 422, the microphone is placed in the hearing aid base structure so that groove (or hole) 411 is opposite projecting member 431. The microphone 400 is then laterally moved to engage the groove 411 and projecting member 431. As shown in FIG. 4(*b*), the microphone 400 is locked in place by inserting locking pin or plate 460 between the microphone and hearing aid base structure 420 in a location generally opposite to groove 411. The locking pin or plate 460 is generally tapered in cross-section so that greater degrees of insertion provide a correspondingly greater bias of the locking pin or plate against the microphone. The locking pin or plate 460 is inserted, by machine or by hand (with or without tools) to a point wherein groove 411 and projecting member 431 are securely mated together. Conventional locking pin retention devices may also be provided.

In still other aspects, the microphone 200, 300, 400 could comprise a thread or threaded portion substantially corresponding in pitch, size, and shape to a mating thread or threaded portion in the hearing aid base structure. The microphone 200, 300, 400 may then be screwed or rotated into place. To prevent the microphone 200, 300, 400 from backing out along the threaded connection, a convention stop device (e.g., a locking collar or a anti-rotation stud or pin) may be employed or integrated into the microphone housing. If conventional hearing aid microphone electrical connections, such as using flexprint, are utilized to electrically connect the microphone, effective securement would have to be attained within only about one full rotation to avoid tangling of the wires. Therefore, the microphone electrical connections could advantageously be configured to specifically account for multiple rotations of the microphone.

Like the ear, hearing aids may be modeled as a Helmholtz resonator. The acoustic mass may be determined by the equation $(M_A)=\rho(L/A)$, where $\rho$ is the density of air, L is the length or depth of the opening into an adjacent cavity and A is the cross-sectional area of the opening. The resonant frequency of a Helmholtz resonator is given by $f_o=\upsilon(A/(VL))^{0.5}$, where $f_o$ is the resonant frequency, $\upsilon$ is the velocity of sound in the medium (e.g., about 340 m/s for air) and V is the volume of air. The bandwidth is also related to a decrease in $M_A$. For example, a decreased L and/or increased A widens the bandwidth by lowering the inertia of the system to improve the high frequency response.

To lower the acoustic mass and provide both a suitable size and bandwidth for a hearing aid, the presently disclosed concepts provide, using the example of FIG. 1(*a*), a microphone mounting structure which enables a hearing aid base structure 120 or faceplate to be formed with a large opening 123 therein (e.g., an acoustical opening or large A), preferably in combination with a microphone slit 175 having a maximal area, to reduce acoustic mass. The disclosed microphone mounting structure also permits utilization of a thinner hearing aid base structure 120 thereby providing a short acoustical opening tunnel length (e.g., a low L) and permitting the microphone 100 to be inserted to a maximal depth within the hearing aid base structure. The large opening in the faceplate further facilitates microphone insertion during manufacture of the hearing aid and removal of the microphone for purposes including repair and replacement.

The purpose of the above description and examples is to illustrate some aspects of the present disclosure without implying any limitation. It will be apparent to those skilled in the art that various modifications and variations may be made to the device and method of the present disclosure without departing from the spirit or scope thereof. The present concepts are intended to apply, for example, to hearing aids comprising a plurality of microphones (e.g., matched pairs of microphones) provided in a hearing aid faceplate. The present concepts may be extended to other hearing aid components, such as but not limited to receivers. The attachment devices (e.g., the resilient protrusions or the grooves) may also be utilized as electrical connectors. For example, the resilient protrusions could be soldered, welded, or otherwise electrically connected to contacts on or in the microphone. In this manner, the resilient protrusions may serve not only as an attachment device, but also as a floating contact or point contacts. Each of these embodiments and obvious variations thereof is contemplated as falling within the spirit and scope of the claimed invention, which is set forth in the following claims.

The appended claims reflect certain aspects and combinations of the present concepts, but are not exhaustive of all such aspects and combinations. For example, the present concepts include all possible logical combinations of the claims an of the various claim elements appended hereto, without limitation, within the associated claim sets regardless of the presently indicated dependency.

What is claimed is:

1. A hearing aid, comprising:
    a microphone including a housing and an attachment device integrated with the housing; and
    a hearing aid base structure comprising another attachment device and including a tool insertion opening leading from a front surface of said hearing aid base structure to said attachment device to permit manipulation of the attachment device through the hearing aid base structure via the tool insertion opening to disengage said attachment device from said another attachment device,
    wherein said attachment device and said another attachment device are configured to matingly and releasably connect the microphone to the hearing aid base structure,
    wherein said attachment device comprises one of a male connector and a female connector, and wherein said another attachment device comprises the other of a male connector and a female connector, and
    wherein at least one of said male connector and said female connector comprises a resilient member having a base portion and a movable portion arranged at an acute angle or an obtuse angle with respect to one another, the base portion and the movable portion connected by a spring hinge permitting angular movement of the base portion relative to the movable portion.

2. The hearing aid according to claim 1, wherein the angular movement is in a direction toward the microphone housing and said hearing aid base structure.

3. The hearing aid according to claim 1, wherein said hearing aid base structure comprises a faceplate.

4. A hearing aid system, comprising:
- a microphone, said microphone comprising a housing and an attachment device integrated with the housing;
- a hearing aid base structure including another attachment device and including a tool insertion opening leading from a front surface of said hearing aid base structure to said attachment device to permit manipulation of the attachment device through the hearing aid base structure via the tool insertion opening to disengage said attachment device from said another attachment device, and
- wherein said attachment device and said another attachment device are configured to matingly and releasably connect the microphone to the hearing aid base structure,
- wherein said attachment device comprises one of a male connector and a female connector, and wherein said another attachment device comprises the other of a male connector and a female connector, and
- wherein said attachment device comprises a base portion and a movable portion arranged at an acute angle or an obtuse angle with respect to one another, the base portion and the movable portion connected by a spring hinge permitting angular movement of the base portion relative to the movable portion.

5. The hearing aid system according to claim 4, further comprising:
- a tool dimensioned for insertion into said tool insertion opening and further dimensioned to bias the attachment device toward the microphone to disengage said attachment device from said another attachment device.

6. A hearing aid system, comprising:
- a cylindrical microphone, said cylindrical microphone comprising a first attachment device and a second attachment device, the first attachment device comprising a resilient protruding member and the second attachment device comprising a groove extending along a circumferential arc of the cylindrical microphone;
- a hearing aid base structure defining a rear opening in a rear portion of the hearing aid base structure, the rear opening being dimensioned to receive the cylindrical microphone, the hearing aid base structure further defining a recess dimensioned to matingly engage the resilient protruding member of the cylindrical microphone, the hearing aid base structure further defining an embossment dimensioned to matingly engage the second attachment device of the cylindrical microphone, and the hearing aid base structure further defining a tool insertion opening through a front portion of the hearing aid base structure leading from a front of the hearing aid base structure into the recess,
- wherein said first attachment device of the cylindrical microphone is configured to matingly engage the recess only when the second attachment device of the cylindrical microphone matingly engages the embossment of the hearing aid base structure.

7. A hearing aid system according to claim 6, wherein said first attachment device comprises a base portion and a movable portion arranged at an acute angle or an obtuse angle with respect to one another, the base portion and the movable portion connected by a spring hinge permitting angular movement of the base portion relative to the movable portion.

* * * * *